United States Patent [19]

Linman et al.

[11] 4,443,099
[45] Apr. 17, 1984

[54] PHOTOGRAPHIC PRINTING SYSTEM

[75] Inventors: Dale L. Linman, Minneapolis; Stephen A. Bartz, Jordan, both of Minn.

[73] Assignee: Lucht Engineering Corporation, Minneapolis, Minn.

[21] Appl. No.: 349,650

[22] Filed: Feb. 17, 1982

[51] Int. Cl.³ ............................................. G03B 27/62
[52] U.S. Cl. ........................................ 355/75; 355/64; 271/11; 414/121
[58] Field of Search ...................... 355/75, 76, 64, 74; 414/80, 121; 271/11, 12, 90, 107

[56] References Cited

U.S. PATENT DOCUMENTS

| | | | |
|---|---|---|---|
| 2,198,169 | 4/1940 | Kallusch | 355/76 |
| 2,251,184 | 7/1941 | Bohannon | 355/75 |
| 2,741,960 | 4/1956 | Oldenboom | 355/64 |
| 2,849,916 | 9/1958 | Nolan | 355/64 |
| 2,999,686 | 9/1961 | Cheeseman et al. | 271/11 |
| 3,146,902 | 9/1964 | Voelker | 414/121 |
| 3,391,926 | 7/1968 | Jaatinen | 414/121 |
| 3,625,377 | 12/1971 | Bohannon et al. | 414/121 |
| 3,879,031 | 4/1975 | Melehan | 271/11 |
| 3,966,318 | 6/1976 | Amort | 355/64 |
| 4,181,428 | 1/1980 | Proulx | 355/75 |

FOREIGN PATENT DOCUMENTS 595706 of 1959 Italy ..................................... 355/75

Primary Examiner—Monroe H. Hayes
Attorney, Agent, or Firm—Kinney, Lange, Braddock, Westman & Fairbairn

[57] ABSTRACT

A photographic printing system including a masking card for carrying a transparency bearing an image to be printed at an aperture thereof. The card contributes to registration of the image within the printer optical path. The masking cards are carried in a first receptacle in stacking relation to others of the masking cards. A printing station is provided generally at the optical path of the printer and a card transport removes masking cards from the first card receptacle and conveys them to the printing station. A second card receptacle is provided while the printing station includes apparatus for ejecting masking cards from the printing station to the second card receptacle.

19 Claims, 6 Drawing Figures

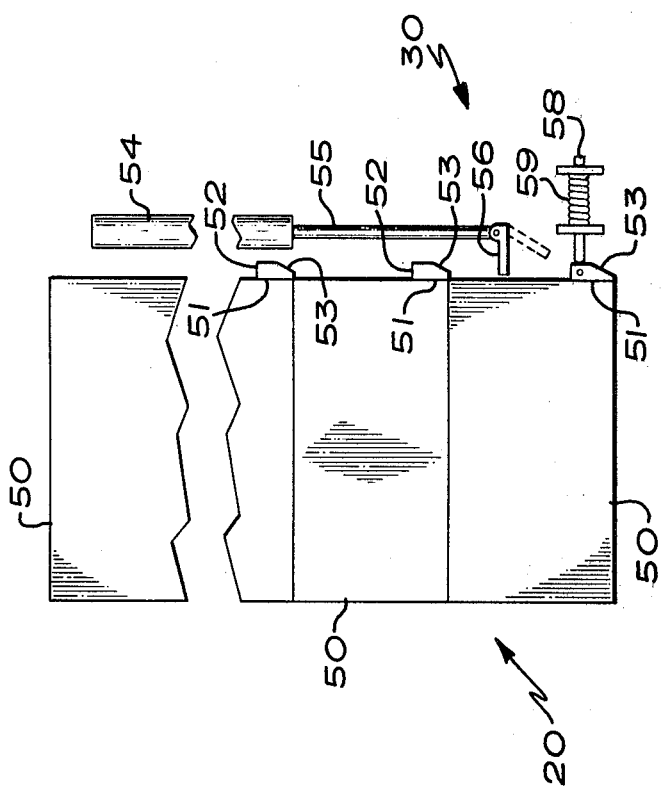
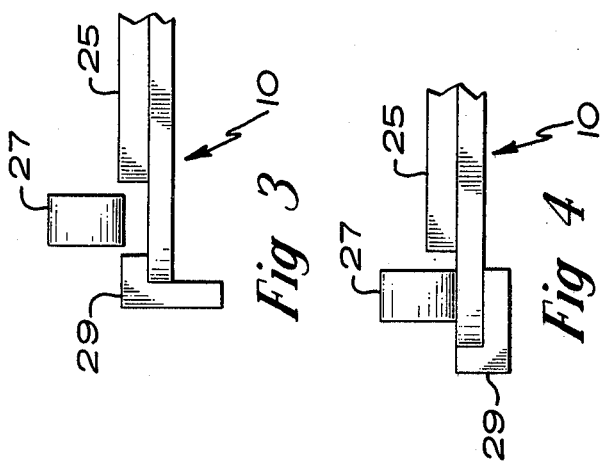
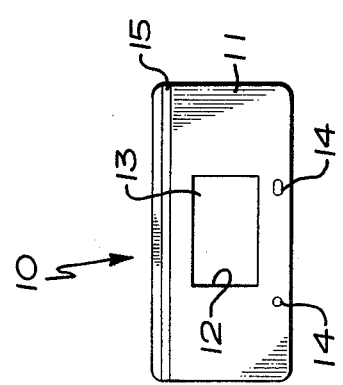
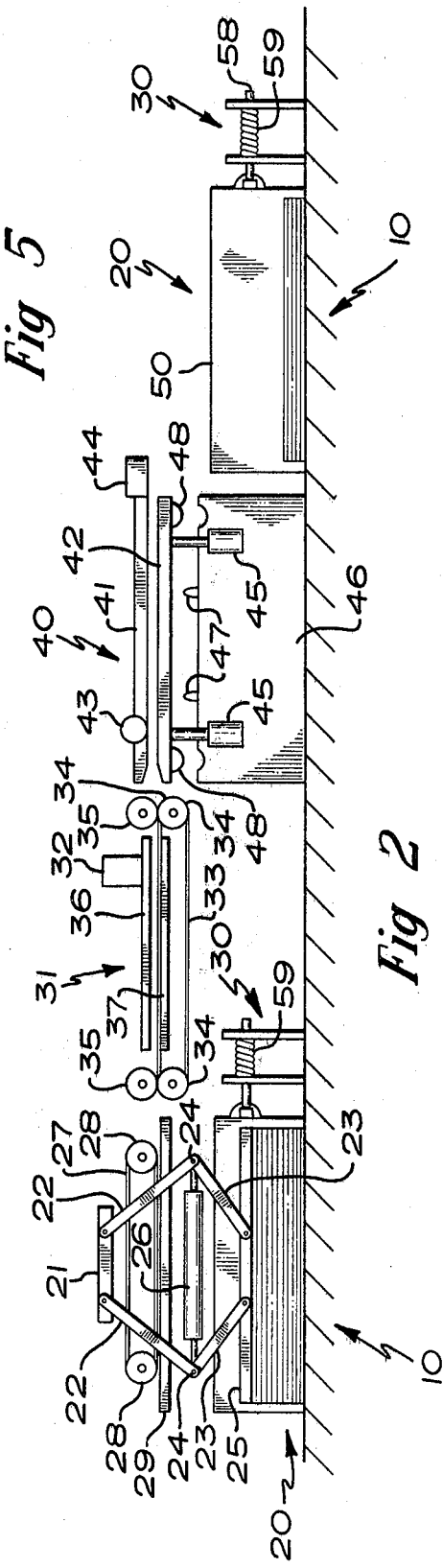

PHOTOGRAPHIC PRINTING SYSTEM

I. DESCRIPTION

BACKGROUND OF PRIOR ART

Photographic printers are known to the prior art. Automatic printers typically include supply and take up rollers for a photosensitive photographic material and a mechanism to automatically advance the material through a Printing station. A shutter is employed to control the exposure.

An example of the type of printer discussed above is disclosed in U.S. Pat. No. 3,951,545 issued Apr. 20, 1976, in the name of Orren J. Lucht for PHOTOGRAPHIC PRINT APPARATUS which is commonly owned with the present invention and which is hereby incorporated by reference. The printer of this patent employs an interchangeable lens assembly formed or stacked, alternative lens configurations. That is, the different lens configurations are spaced from each other along the general direction of the printer optical path. They are movable, within the lens assembly, between first and second positions—one of those positions being within the optical path of the printer with the other being without the optical path. Selectively actuated plungers are operative to position the desired lens configuration within the printer's optical path.

The printer of the above-incorporated patent provides greater flexibility than other prior art printers and has contributed significantly to the photographic printing industry. Its output is a roll of exposed photographic material which, when processed, produces a roll of photographic prints. Typically, a single image bearing transparency is employed for multiple exposures of varying sizes. Thus, each exposure may require a change in lens configuration.

Information as to the number of exposures and desired print sizes must be presented to the printer for the selection of the proper lens configuration. Other information such as color balance, crop size, etc., must also be presented. Such information may be presented manually, a time consuming operation. Alternatively, the information may be recorded on information storage media, such as a reel of magnetic tape, for automatic control of the exposure parameters. This has been done sequentially for multiple transparencies requiring that the transparency sequence be maintained. Further, the recording process is a manual one and does not offer an efficient check on the data entered.

An automatic control of printer exposure parameters that avoids sequence dependency while eliminating at least some manual data entry is disclosed in concurrently filed U.S. patent application Ser. No. 349,649 filed in the name of Stephen A. Bartz for a PHOTOGRAPHIC PRINTING SYSTEM INCLUDING AN IMPROVED MASKING CARD which is commonly owned with the present invention and which is hereby incorporated by reference. The control in the incorporated Bartz specification is provided by an improved masking card, the masking card carrying a transparency bearing an image to be printed at an aperture thereof while contributing to registration of the image relative to the printer optical axis, in known manner. Information storage media is carried by the card and includes a plurality of data blocks dedicated to a printer exposure parameter. Marked boxes bearing ghost character outlines of an optically readable character font are preprinted on the card. Data representative of desired exposure parameters may be entered on the card by tracing the ghost character outlines, the tracings then being optically readable and the information they convey being transferable to the information storage media. Thus, by reading the information storage media, which is typically a strip of magnetic tape, the exposure parameters of the printer may be automatically controlled. However, an efficient handling of the masking cards of the type described has not heretofore been available.

BRIEF SUMMARY OF INVENTION

The present invention provides a photographic printer wherein a transparency bearing an image to be printed is positioned within the optical path of the printer. The transparency is carried by a masking card with the image to be printed at an aperture thereof. The card contributes to registration of the image within the printer optical path with the present invention providing an improved handling of the card.

A plurality of cards are retained in a first card receptacle in stacking relation to others of the cards. The printer includes a printing station generally at its optical path while a card transport system individually removes cards from the first card receptacle and conveys the cards to the printing station. A second card receptacle is provided to receive masking cards from the printing station, the printing station including apparatus for ejecting cards therefrom.

In a preferred embodiment, the first and second receptacles each include a plurality of bins and a mechanism for selectively positioning the first and second receptacle bins in operative relation to the masking card removing apparatus and the printing station card ejecting apparatus, respectively. The cards may be removed from the first receptacle bins by a device for lifting the top card of the stacked cards while aligning a lifted card with the card conveying system. The conveying system may include a driven belt.

As is known in the prior art, the masking cards may be provided with registration holes with the printing station including pins for cooperating with those registration holes to establish image registration within the printer. In the present invention, the printing station is provided with a movable track which supports the cards while inserting the pins within the registration holes and, after exposure of the print material, removes the masking card from the pins. An adjustable printing station mask is also provided which includes a plurality of movable leaves, including first and second pairs of leaves. The leaves of each pair are spaced from each other with the leaf pairs being generally orthogonal to each other. A lead screw is provided for each leaf pair with the leaves of each pair moving in opposite directions on rotation of the lead screw. A stepping motor may be employed to drive the lead screws.

BRIEF DESCRIPTION OF DRAWINGS

FIG. 1 illustrates a masking card of the type with which the system of the present invention cooperates.

FIG. 2 is a diagrammatic illustration of the several operating characteristics of the system of the present invention.

FIGS. 3 and 4 illustrate the operation of a portion of the embodiment of FIG. 2.

FIG. 5 illustrates a portion of the embodiment of FIG. 2.

DETAILED DESCRIPTION OF INVENTION

Figure 6:
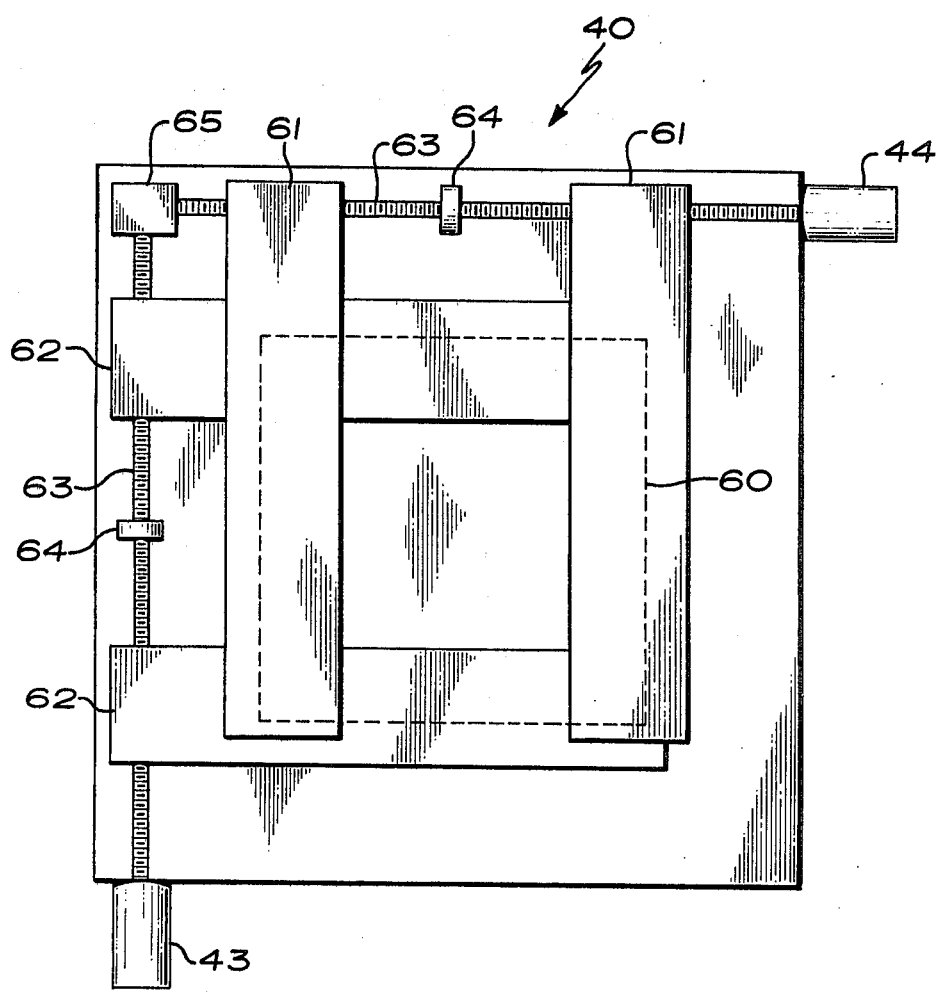
FIG. 6 illustrates the adjustable masking aspect forming a part of the present invention.

Referring now to FIG. 1, there is shown a masking card designated generally at 10 that is employed in the system of the present invention. The masking card has a main body portion 11 and an aperture 12, the card 10 carrying a transparency 13 bearing an image to be printed at the aperature 12. Registration holes 14 are provided within the card which also carries a magnetic tape 15, the tape including data blocks dedicated to specific exposure parameters. Information is recorded on the information storage media or tape 15 in known manner. In the context of the incorporated Bartz specification, some of that information is contained at mark sites, each mark site being dedicated to an exposure parameter with at least some of the mark sites including ghost character outlines of an optically readable character font. Typically, the masking card 10 is formed of a paper stock which may require a sealing treatment to reduce its porosity for the purpose of facilitating its handling by vacuum or negative pressure devices. Such sealing treatment is known to the prior art.

FIG. 2 diagrammatically illustrates the card handling aspects of the photographic printer of the present invention. For the purpose of clarity, supporting structures and motion imparting devices, such as motors, have been largely omitted from the drawing. The selection and design of appropriate structures and motion imparting devices is within the skill of one ordinarily skilled in the art.

Still with reference to FIG. 2, a receptacle 20 retains a plurality of masking cards 10 in stacking relation to each other. A stationary support 21 is positioned above the receptacle 20 and has arms 22 pivotally secured thereto. Another pair of arms 23 are pivotally connected to the arms 22 at a pivot joint 24 while being pivotally connected to a vacuum plate 25 at the end opposite the pivot joint 24. A cylinder 26 extends between the pivot joints 24. The cylinder 26 may be pneumatic or hydraulic or, alternatively, may be electrically activated. Preferably, the cylinder 26 is double acting such that on extension of its rod, the plate 25 is lifted from the stack of masking cards 10 while on retraction of its rod, the plate 25 is lowered to the stack of masking cards 10.

Vacuum plate 25 is connected (not shown) to a negative pressure or vacuum such that when it contacts the top card of the stacked cards within receptacle 20 it will attract that card and hold it. With the card 10 held by the vacuum plate 25, extension of the rod of the cylinder 26 will cause the plate 25 to lift thereby "picking" or lifting the top card of the card stack within the receptacle 20. The rod of cylinder 26 is extended until the lifted card is brought into contact with a continuous belt 27, the belt 27 being supported by and driven over rollers 28. Two such belts 27 and cooperating rollers 28 may be provided, one along each edge of a card 10 with the arms 22 and 23 and vacuum plate 25 operating between those belts 27 and rollers 28. Pivotable bars 29 (one shown), to be described more fully with reference to FIGS. 3 and 4, align the lifted card relative to the belts 27 as well as the remaining elements of the conveying system to be described more fully below while providing a track along which the cards may be driven by the belts 27. A receptacle positioning system designated generally at 30 is described more fully with reference to FIG. 5.

On rotation of the belts 27 under the action of the rollers 28, a card in contact with the belts 27 will be conveyed along the track of bars 29 to a reading station designated generally at 31. The reading station 31 includes a reader 32 capable of reading the information contained on the information storage media 15 with the card being conveyed into, through and from the reading station 31 by a continuous belt 33 which is supported and driven by rollers 34. Two such belts 33 may be provided within the reading station 31 each being provided with cooperating idler rollers 35 to facilitate the conveyance of the card through the reading station 31. Upper and lower guides, 36 and 37, respectively, may also be provided to facilitate movement of a card within the reading station 31.

A printing station is provided generally at the optical path of the printer and is designated generally at 40. The printing station is positioned to receive a card from the reading station 31 within a track formed by upper and lower track forming members 41 and 42, respectively. The members 41 and 42 have a central aperture through which the image to be exposed is projected while the upper member 41 carries an adjustable mask to be described more fully below with reference to FIG. 6. Stepper motors 43 and 44 are provided for adjustment of the mask to be described. Track members 41 and 42 are supported by cylinders 45 which are supported within a base 46. The cylinders 45 may be hydraulic or pneumatic or, alternatively, may be electrically activated. The rods of the cylinders 45 extend from the base to engage the track formed by the members 41 and 42. Pins 47 extend from the base 46 toward the track. Drive rollers 48 are carried by the member 42 with the lefthand drive roller 48 accepting a card from the reading station 31 and driving it along the track to a position wherein the registration holes 14 overlie the pins 47. At this point, movement of the card is stopped and the rods of the cylinders 45 are retracted to insert the pins 47 within the registration holes 14 to assure proper registration of the image 13 carried by the card 10. Printing may then be accomplished with the exposure parameters being those read by the reader 32 as the card passes through the reading station 31. On the completion of printing, the rods of the cylinders 45 are extended thus removing the registration holes 14 from the pins 47 with the righthand roller 48 of the printing station 40 then ejecting the card within the printing station to a second receptacle 20. The second receptacle 20 may be essentially the same as the first receptacle including the registration elements 30, the second receptacle 20 accepting and retaining the cards 10 in stacked relation to each other.

FIGS. 3 and 4 illustrate the operation of the members 29 which are a generally L-shaped bar pivotally movable between an open position (FIG. 3) and a closed position (FIG. 4). There are two members 29 each positioned to cooperate with one of two opposing edges of the cards 10, members 29 lying generally parallel with belts 27. In the open position of FIG. 3, members 29 will accept the card 10 lifted by the vacuum plate 25 as illustrated in FIG. 3. When the card 10 is in the position illustrated in FIG. 3, the member 29 may be pivoted to provide a track to support the card 10 while urging it against the belts 27 to result in movement of the card to the reading station 31 on rotation of the rollers 28 and movement of the belt 27.

In a preferred embodiment, the receptacles 20 of FIG. 2 include a plurality of bins 50 as illustrated in FIG. 5. FIG. 5 is a top view of the bins 20 of FIG. 2 along with the registration elements 30. Each of the bins 50 is configured to accept and retain a plurality of cards 10 in stacking relation to each other, one of the receptacles 20 being loaded with cards bearing images to be exposed while the other accepts and retains cards bearing images which have been processed through the reading station 31 and printing station 40. When the last card of a bin 50 has been lifted or bin 50 has become full of cards ejected from the printing station 40, the receptacle 20 is advanced to position the next adjacent bin to supply unexposed cards or accept cards ejected from the printing station 40.

Each of the bins 50 is provided with a cooperating tooth 51, each tooth 51 including a bearing surface 52 and a camming surface 53. A cylinder 54 is supported along the side of the receptacle 20 having an extendable rod 55, in known manner. The cylinder 54 may be of the same type as the cylinder 26 and cylinder 45, or may differ therefrom. The rod 55 carries at its end a pawl 56, the pawl 56 being pivotally mounted at the end of the rod between a first position illustrated in even lines and a second position illustrated in phantom. The pawl 56 is biased in the first position. A detent is formed of a rod 58 which is insertable within a depression on each of the teeth 51, the rod 58 being biased into a tooth depression by a compression string 59, the tooth depression, rod 58 and compression spring 59 forming a detent, in known manner.

Assuming that the bins 50 of the receptacle 20 of FIG. 5 carry cards to be exposed within the printing station 40 of FIG. 2, the receptacle 20 is positioned with its first (lowermost in FIG. 5) bin 50 beneath the vacuum Plate 25. Another receptacle 20, with empty bins 50 is similarly positioned relative to the printing station 40. The vacuum plate 25 will sequentially lift cards, one at a time, into the conveying system of the present invention for transport to the printing station 40 and ejection from that printing station 40 into a second receptacle 20. When the bin is empty, the rod 55 of cylinder 54 will be retracted, if it is not already retracted, with the pawl 56 swinging to the position illustrated in phantom in FIG. 2 at the urging of the camming surface 53 of the next bin 50. After clearing the tooth whose camming surface 53 caused pivotal movement of the pawl 56, the pawl will resume the position illustrated in even lines in FIG. 5 such that extension of the rod 55 will cause the pawl 56 to engage the bearing surface 52 of the tooth cooperating with the next bin. The force of the detent is insufficient to withstand an advance of the receptacle 20, that advance being established by the travel of the rod 55 and being selected such that the rod 58 will engage the detent of the next tooth 51, the rod 58 first engaging the camming surface 53 to compress the spring 59. The detent force is, however, sufficient to maintain the receptacle in position as the camming surface 53 moves the pawl 56 to the position shwon in phantom in FIG. 5. The receptacles 20 may be supported in any known manner such as drawer guides, tracks or wheels.

FIG. 6 illustrates a top view of the printing station 40 including the stepper motors 43 and 44 illustrated in FIG. 2. The printing station includes an aperture at 65 which the image to be exposed is positioned through the cooperation of the registration apertures 14 of card 10 and the pins 47. This aperture is illustrated in phantom at 60. A plurality of leaves lie along the aperture 60 edge in pairs 61 and 62. Each of the leaf pairs 61 and 62 is threadedly engaged by one of a pair of lead screws 63, the two lead screws 63 being engaged by a different one of the stepper motors 43 and 44 to cause rotation of the lead screw 63 under the influence of the stepper motors 43 and 44, in known manner. Threads of each of the lead screws 63 are of opposite "handedness" for each of the leaves of the leaf pairs 61 and 62 with which they are threadedly engaged. That is, one leaf of the leaf pair 61 is threadedly engaged by a righthand screw while the other is threadedly engaged by a lefthand screw. The same is true of the leaf pairs 62. In this manner, rotation of a lead screw 63 will cause the individual leaves of the leaf pair with which it is associated to move in opposite directions. In this manner, the effective opening of the aperture 60 may be selectively altered. Bearings 64 and 65 may be employed to support the lead screw 63.

Obviously, many modifications and variations of the present invention are possible in light of the above teachings. For example, and as noted above, the receptacles 20 may be supported in any desired manner. The various linear motion imparting devices, such as cylinders 26, 45 and 54, may be of any known type. Further, the detent may take any known design to establish registration between a bin and its associated portion of the present invention. Also, although the motors 43 and 44 are described as stepper motors, any controllable motor may be employed. Indeed, the various powered elements shown and described with reference to the drawings may be any known motor type, the motor type and their control being known to the prior art. Further, various position sensors may be advantageously employed to determine that a card is at a desired location within the system. It is therefore to be understood that, within the scope of the appended claims, the invention may be practiced otherwise than as specifically described.

We claim:

1. In a photographic printer of the type wherein a transparency bearing an image to be printed is positioned within the optical path of the printer, the transparency being carried by a masking card with the image to be printed at an aperture thereof and the card contributing to registration of the image within the printer optical path, an improved card handling system which comprises:
    first card receptacle means for retaining a plurality of said masking cards each in stacking relation to others of said masking cards;
    printing station means generally at the optical path of said printer;
    card transport means including means for individually lifting a top masking card from said first card receptacle means, means pivotable between a first position for accepting a lifted card and a second position for providing a track for an accepted card and means for conveying cards within said track to said printing station means; and
    second card receptacle means for receiving said masking cards from said printing station means, said printing station means including means for ejecting masking cards therefrom.

2. The photographic printer of claim 1 wherein said first and second receptacle means each comprise a plurality of bin means, said first receptacle means including means for selectively positioning said first receptacle means bin means relative to said masking card removing means and said second receptacle means including means for selectively positioning said second receptacle means bin means relative to said printing station means masking cards ejecting means.

3. The photographic printer of claim 2 wherein said first and second receptacle means selectively positioning means each comprise:
   a plurality of teeth means carried by said receptacle means;
   linear motion imparting means; and
   pawl means carried by said linear motion imparting means and engageable with said teeth means for imparting motion to said receptacle means.

4. The photographic printer of claim 3 wherein said first and second receptacle means selectively positioning means each further comprise means for establishing and maintaining bin means registration relative to the associated masking card removing means and printing station means masking cards ejecting means.

5. The photographic printer of claim 4 wherein said teeth means comprise bearing surface means and camming surface means, said pawl means being pivotally connected to said linear motion imparting means and biased in a first position in alignment with said bearing surface means, said camming surface means deflecting said pawl means from said first position.

6. The photographic printer of claim 5 wherein said bin means registration establishing and maintaining means comprise detent means.

7. The photographic printer of claim 1 wherein said conveying means comprises means engageable with a lifted card within said track.

8. The photographic printer of claim 1 wherein said top masking card lifting means comprises vacuum plate means.

9. The photographic printer of claim 1 wherein said conveying means comprises belt means including means engageable with a lifted card within said track.

10. The photographic printer of claim 1 wherein said masking cards include a plurality of registration holes therein, said printing station means comprising pin means for cooperating with said registration holes for establishing image registration within said printer.

11. The photographic printer of claim 10 wherein said printing station means further comprises movable masking card track means for inserting said pin means in said registration holes and removing a masking card from said pin means.

12. The photographic printer of claim 1 wherein said printing station means comprises adjustable mask means including a plurality of movable leaves.

13. The photographic printer of claim 12 wherein said movable leaves comprises a first pair of leaves and a second pair of leaves, the leaves of each pair being spaced from each other and the leave pairs being generally orthogonal to each other.

14. The photographic printer of claim 13 further comprising lead screw means associated with each leave pair, the leaves of each pair moving in opposite direction on rotation of the associated lead screw means.

15. The photographic printer of claim 14 further comprising stepper motor means driving each lead screw means.

16. In a photographic system of the type wherein a transparency bearing an image to be printed is carried by a masking card, the system including card receptacle means for retaining a plurality of said masking cards each in stacking relation to others of said masking cards, the improvement for individually removing masking cards from said card receptacle means which comprises means for lifting a top masking card from said card receptacle and means pivotable between a first position for accepting a card lifted from said receptacle means by said lifting means and a second position for supporting an accepted card along opposing edges thereof.

17. The photographic system of claim 16 wherein said pivotable means provide a track for an accepted card in said second position.

18. The photographic system of claim 7 further comprising means for conveying a card along said track and including means engageable with a card within said track.

19. The photographic system of claim 18 wherein said lifting means comprises vacuum plate means.

* * * * *